G. J. WARD, Jr.
Cooking Apparatus.
No. 201,725.    Patented March 26, 1878.
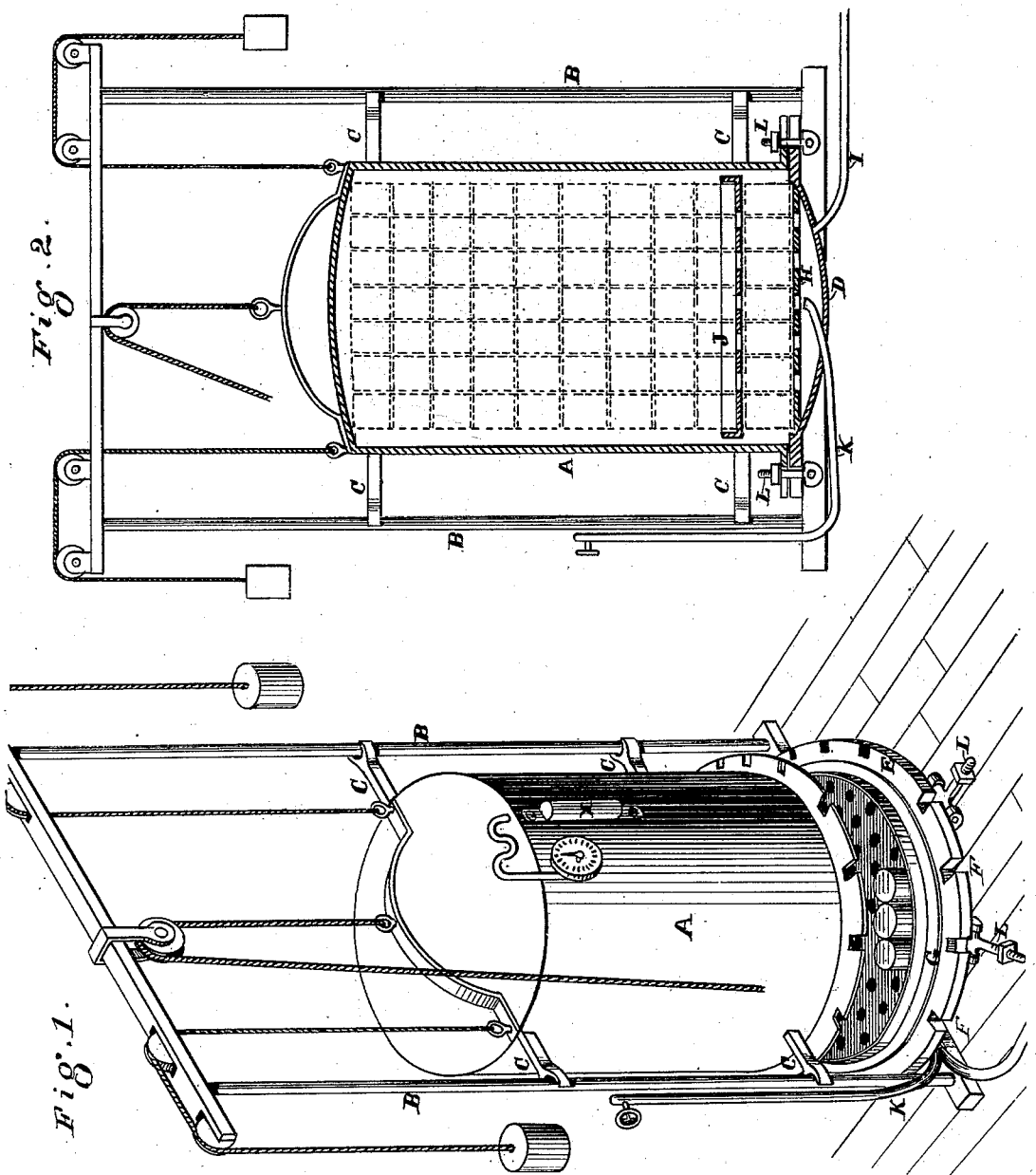
Witnesses
Geo. H. Strong
Joseph A. Bayless
Inventor.
Geo. J. Ward jr.
By their atty's
Dewey & Co.

UNITED STATES PATENT OFFICE.

GEORGE J. WARD, JR., OF SAN FRANCISCO, CALIFORNIA.

IMPROVEMENT IN COOKING APPARATUS.

Specification forming part of Letters Patent No. 201,725, dated March 26, 1878; application filed February 5, 1878.

*To all whom it may concern:*

Be it known that I, GEORGE J. WARD, Jr., of the city and county of San Francisco and State of California, have invented a Cooking Apparatus; and I do hereby declare the following to be a full, clear, and exact description thereof, reference being had to the accompanying drawings.

My invention relates to an improved device for steaming or cooking fish, meats, fruits, or vegetables, more particularly such as are to be sealed up in cans for preservation.

It consists in the construction of an inverted metallic tank, secured to a base and made airtight by means of hinged bolts, holding a wooden packing between its metallic flanges; also of movable trays with perforated bottoms. The said tank has a steam-gage and a pipe for the admission of steam; also a pipe for the discharge of condensed water.

Various methods have been employed for cooking hermetically-sealed goods; but that most generally employed, where the temperature is to be raised considerably above that of boiling water, is to place the cans into a solution of salt, chloride of calcium, or other suitable substance the boiling-point of which is considerably above that of water. The use of these solutions stains the cans, destroys some of the goods, and greatly increases the labor of handling, cleaning, and packing.

My invention is intended to produce a mechanism which is easily operated, which may be opened and closed hermetically in a very short time, and in which a large number of cans may be handled easily, kept clean, and their contents cooked with rapidity and without variation. The pressure of the external steam, which is considerable, and in proportion to the increased temperature, tends to prevent the cans from being exploded by the act of cooking, and the percentage of loss is much less than when the cooking is done by a high temperature unaccompanied by high pressure.

In the accompanying drawings, Figure 1 is a perspective view of my device. Fig. 2 shows the inverted chamber, base, and one of the trays J in section.

A is an inverted metallic chamber. B B are vertical standards at the sides, secured to a proper base or support. These standards have a cross-bar at the top, to which may be attached pulleys with cords and weights, to act as a counter-balance to the chamber A, which, when raised or lowered, is kept in place by lugs C C, working on the standards B B as guides. These guides are held at the bottom by a cross-bar fastened to the floor. Upon the top of the inverted chamber A is a steam-gage, X, to indicate the pressure of steam by which the apparatus is heated. D is a stationary base, corresponding with the chamber A, and provided with a flange, E, having slots in its edge, and corresponding slots are made in the flange around the base of the chamber. These slots are provided with hinged bolts L, and, for the purpose of making the chamber A airtight, a packing of wood, G, is placed between the metallic flanges of the tank and base.

Steam is admitted to the apparatus by a pipe, K, which enters through the base D. This base has a concave bottom, over which a flat disk or false bottom, H, is placed. The latter is perforated, so as to allow any condensed water that may be in the apparatus to fall through into the concave below, and pass off by means of a trap and waste-pipe, I, as shown.

Removable trays J J, holding cans of material to be cooked, are placed in the apparatus. The bottoms of these trays are perforated, so that steam will pass up through, and any liquid which may drop into them will pass through to the waste-pipe in the base below.

The operation of my apparatus is as follows: I fill cans with the material to be cooked, and place a number of them on the false bottom H, or upon a tray. I then fill other cans, and put them in one of the trays J, placing it on top of the first number of cans, continuing the operation until the apparatus is filled up. I then lower the inverted tank A, and secure it to its base by means of the hinged bolts and slots in the flanges. Steam is then admitted through the pipes until the gage shows the desired pressure and corresponding increase of heat, and the cooking proceeds. The interior pressure upon the cans tends to bulge them, and when the cooking takes place in open vessels many of the cans explode; but in my apparatus the exterior pressure upon the cans tends to resist that from the interior, and prevent them from being exploded.

Having thus described my invention, I do not claim, broadly, the employment of steam for the purpose of cooking; nor do I claim an inclosing-vessel for holding the cans where the pressure is little or nothing, such forms of apparatus being already known; but

What I do claim as new, and desire to secure by Letters Patent, is—

1. The vertically-moving open-bottomed chamber A, counterbalanced and capable of resisting steam-pressure, in combination with the stationary base D, with securing bolts or clamps L, and packing-ring, so that the chamber may be rendered steam-tight or released and opened, substantially as herein described.

2. The vertically-moving chamber A and the base D, having the flanges slotted, as shown at F, in combination with the hinged or swivel bolts L, for rapidly locking the parts and making them steam-tight, or releasing the chamber, substantially as herein described.

In witness whereof I have hereunto set my hand and seal.

GEORGE J. WARD, JR. [L. S.]

Witnesses:
WALTER C. BEATY,
FRANK H. BROOKS.